July 13, 1926.
C. R. BRANSON
1,592,255
PULLEY WHEEL
Filed June 7, 1923
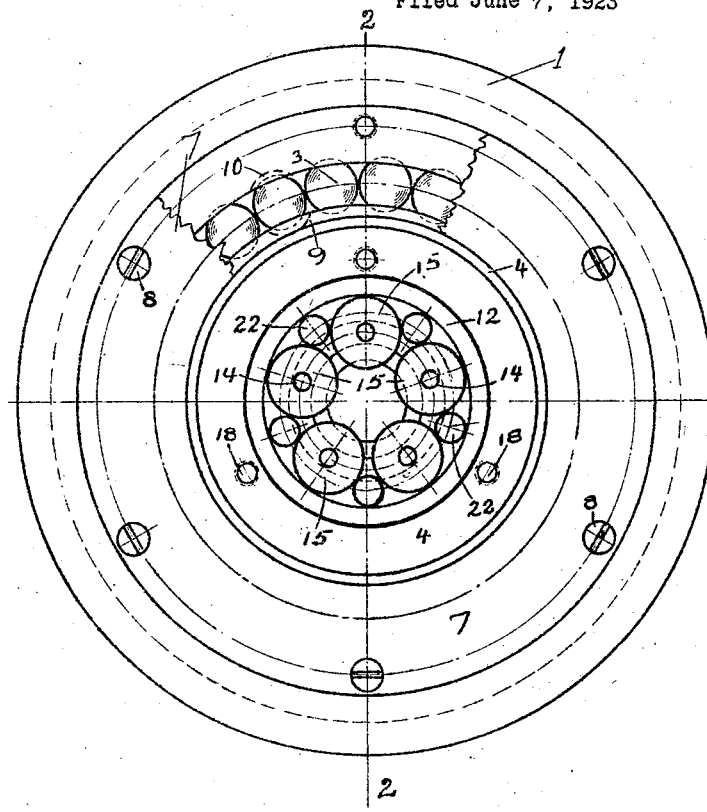
FIG. 1.
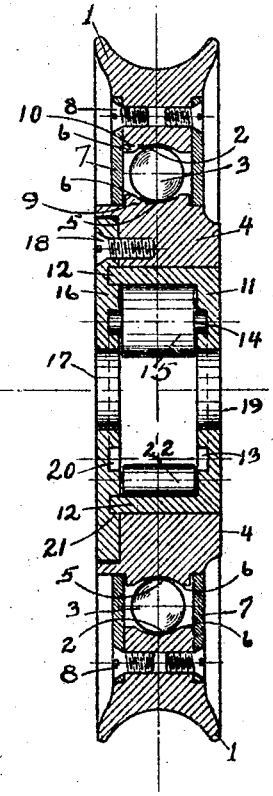
FIG. 2.
FIG. 4.
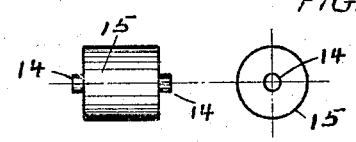
FIG. 3.
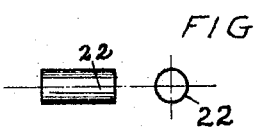
FIG. 6.
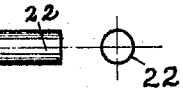
FIG. 5.
CHARLES R. BRANSON
INVENTOR.
BY *A. S. Paré*
ATTORNEYS.

Patented July 13, 1926.

1,592,255

UNITED STATES PATENT OFFICE.

CHARLES R. BRANSON, OF SAN FRANCISCO, CALIFORNIA.

PULLEY WHEEL.

Application filed June 7, 1923. Serial No. 643,911.

This invention relates to sheaves, and pulley wheels. The objects of the invention include the production of a sheave or pulley wheel with provisions for antifriction devices combined therewith; the production of a sheave or pulley wheel with a plurality of independent antifriction devices, whereby an interference with the operation of one, will still leave one to function. Other, and incidental, objects and features will develop as the description progresses.

In the accompanying one sheet of drawing I have illustrated a sheave containing my invention. The block, or housing, in which the sheave operates, forming no part of the invention, is not illustrated.

Figure 1 is a face view of a sheave, one of the face rings being partly broken away to show the ball bearings behind it, and one of the central face plates being omitted to show the roller bearings.

Figure 2 is an axial section, on the line 2, 2 of Figure 1.

Figure 3 is a face view of a roller bearing.

Figure 4 is an end view of Figure 3.

Figure 5 is an elevation view of an auxiliary, or spacing roll.

Figure 6 is an end view of Figure 5.

Referring to the drawing and the figures thereof:—

The outer member of the sheave is in form of an annulus 1, the outer face of which is shown as concaved to receive a rope or cable, not shown, if such be used with it. Or the face may be otherwise shaped to match whatever form of member engages it.

The inner periphery of the annulus, is also concaved, as at 2, to form a runway for the ball bearings 3. Within the annular member 1, is an annular block member 4 whose outer periphery is concaved as at 5 to receive the balls 3 which travel around on it, between it and the member 1, thus constituting an antifriction bearing at that point.

On each side of the concavity 5 is a shoulder 6 against which bears the inner edge of a flat ring 7, whose outer edge bears against a similar shoulder on each side of the concavity 2. Screws 8 secure the rings 7 to the member 1, thus maintaining the members 1 and 4 in concentric relation.

At any suitable point the shoulder 6 of concavities 2 and 5 are cut away, as indicated by dotted lines at 9 and 10 in Figures 1 and 2, to permit the insertion and withdrawal of the balls 3. The inner periphery of member 4 is plain, and fitting against it is the outer periphery of an annular member 11, having an angular projecting edge 12. On the interior face of member 11, is a circular and concentric groove 13, to receive the trunnions 14 on the ends of rollers 15, which will be presently described, a circular plate 16 having a hole in the middle at 17 is fitted to the sheave or pulley against the open side of member 11, and is secured by screws 18 entering the member 4. The hole 17 registers with a central hole 19 in member 11, the two holes designed for the passage of the wheel arbor or shaft, not shown. On the inner face of plate 16 is a circular groove 20, registering in position with groove 13, and intended for the same purpose. Encircling groove 20 is a second circular groove 21, adapted to receive the edge 12 of member 11.

Rollers 15 constitute an antifriction bearing for the member 11, upon the wheel arbor, not shown. The trunnions 14 at the ends of each roller 15 run in the grooves 13 and 20, and prevent any roller from dropping toward the center, when the arbor is withdrawn. Between each two adjacent rollers 15, I position small rolls 22 which bear against rollers 15 and against member 11 and serve as spacers to keep rollers 15 from contacting each other.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit and scope of my invention as defined in the appended claims.

What I claim and desire to secure by Letters Patent of the United States, is the following, to-wit:—

Claims—

1. A pulley wheel comprising three concentric members, the outer one of which forms an annulus, said annulus provided with a ball race, a second member having a ball race, bearing balls between said annulus and second member having substantially point contact therebetween and a first or inner member provided with a series of anti-friction rolls, trunnions on said rolls and annular grooves in which said trunnions travel, spacers between said rolls, side plates adapted to maintain said outer and second members in concentric relation and cover the space therebetween, said annulus and first and second member revoluble independently of each other.

2. A pulley wheel comprising, an annulus or outer member, a second concentric member having a ball race, bearing balls between said members having substantially point contact therebetween, a first or inner concentric member provided with an arbor opening, said inner member provided with a series of anti-friction rolls, annular grooves in said inner member, trunnions on said anti-friction rolls adapted to travel in said grooves, spacers between said rolls and lateral removable flat rings secured between said outer and second members to cover the space therebetween, and maintain said outer and second members in concentric relation.

3. A pulley wheel comprising three concentric members, the outer one of which forms an annulus, said annulus provided with a ball race, a second member having a ball race, bearing balls having substantially point contact in said races and a first or inner member provided with a series of anti-friction rolls, trunnions on said rolls and annular grooves in which said trunnions travel, spacers between said rolls and means to maintain said outer and second members in concentric relation.

In testimony that I claim the foregoing I have hereto set my hand this 1st day of June, 1923.

CHARLES R. BRANSON.